US012730707B2

(12) United States Patent
Young

(10) Patent No.: US 12,730,707 B2
(45) Date of Patent: Sep. 8, 2026

(54) REMOTE CONSOLE DIAGNOSTIC TOOLS

(71) Applicant: Ivanti, Inc.

(72) Inventor: Steven Young, York (GB)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 19/023,066

(22) Filed: Jan. 15, 2025

(65) Prior Publication Data

US 2025/0231832 A1 Jul. 17, 2025

Related U.S. Application Data

(60) Provisional application No. 63/620,971, filed on Jan. 15, 2024.

(51) Int. Cl.
*G06F 11/07* (2006.01)
*G06F 11/32* (2006.01)
*G06F 11/34* (2006.01)

(52) U.S. Cl.
CPC ........ *G06F 11/0793* (2013.01); *G06F 11/321* (2013.01); *G06F 11/3476* (2013.01); *G06F 2201/865* (2013.01)

(58) Field of Classification Search
CPC ............... G06F 11/0793; G06F 11/321; G06F 11/3476; G06F 2201/865
See application file for complete search history.

(56) References Cited

U.S. PATENT DOCUMENTS 5,594,663 A * 1/1997 Messaros ........... G05B 19/0426 702/184
8,116,933 B2 * 2/2012 Underdal ................. G06N 5/02 701/32.8
10,291,498 B1 * 5/2019 Gailloux ................. H04W 4/00
11,093,320 B2 * 8/2021 Reed ................... G06F 11/0709
11,373,460 B2 * 6/2022 Badri ...................... G07C 5/008
11,392,471 B2 * 7/2022 Ferreira .............. G06F 11/2294
2006/0095230 A1 * 5/2006 Grier .................. G05B 23/0216 702/183
2006/0150008 A1 * 7/2006 Srinivas ................ G06F 11/079 714/12
2007/0106979 A1 * 5/2007 Felts ................... G06F 9/44536 717/124
2009/0265139 A1 * 10/2009 Klein .................... G06F 11/366 702/183

(Continued)

*Primary Examiner* — Jonathan D Gibson

(57) ABSTRACT

A diagnostic tool configured to locally implement two or more diagnostic tests related to an on-premises patch management product operating on a defective endpoint device. The diagnostic tool includes one or more non-transitory computer-readable storage media configured to perform a console diagnostic test, an endpoint diagnostic test, and an agent diagnostic test to validate a functionality and an application configuration relating to the defective endpoint device responsive to the launch of the diagnostic tool and without further action by a user of the defective endpoint device. The diagnostic tool is configured to identify diagnostic failures and diagnostic successes resulting from the diagnostic tests, to determine suggested solutions to the diagnostic failures, generate a display that depicts the results of the diagnostic tests, and cause removal of the diagnostic tool from the defective endpoint device after the display of the graphical user interface is caused.

20 Claims, 6 Drawing Sheets

(56) References Cited

U.S. PATENT DOCUMENTS

2013/0132775 A1* 5/2013 Onoue ................. G06Q 10/063 714/33
2015/0195182 A1* 7/2015 Mathur ............... G06F 11/2289 714/27
2015/0261598 A1* 9/2015 Balasubramanian ........................ G06F 11/0709 714/10
2020/0110620 A1* 4/2020 Nguyen ................. G16H 10/60
2021/0357205 A1* 11/2021 Ashirvad ................ G06F 8/658
2023/0110616 A1* 4/2023 Mracek ............... B60R 16/0232 701/29.1
2024/0193277 A1* 6/2024 Manuel-Devadoss ....................... G06F 21/577
2025/0231832 A1* 7/2025 Young ................. G06F 11/3476

* cited by examiner

400

Console Settings
☐ Authenticated proxy

| Date and time 404 | Event 402 | Status 406 |
|---|---|---|
| **2023-09-04 12:52:10** | **System File Validation** | |
| 2023-09-04 12:52:10 | Application installation 410 | PASSED |
| 2023-09-04 12:52:10 | Core Engine/definitions contents | PASSED |
| **2023-09-04 12:52:10** | **Security: Account validation** | |
| 2023-09-04 12:52:13 | Administrator Group Membership | PASSED |
| 2023-09-04 12:52:14 | User Rights Assignment | PASSED |
| **2023-09-04 12:52:14** | **System: Information Gathering** | |
| 2023-09-04 12:52:14 | Database connection details | PASSED |
| **2023-09-04 12:52:14** | **Network: Proxy configuration** | |
| 2023-09-04 12:52:14 | Query configuration 412 | DISABLED |
| **2023-09-04 12:52:14** | **Network: Internet access** | |
| 2023-09-04 12:52:14 | Webpage test-https://www.ivanti.com | PASSED |
| 2023-09-04 12:52:14 | Webpage test – https://google.com/ | PASSED |
| **2023-09-04 12:52:14** | **Network: TLS configuraiton** | |
| 2023-09-04 12:52:14 | Query configuration 414 | FAILED |
| **2023-09-04 12:52:14** | **Network: Port Connectivity** | |
| 2023-09-04 12:52:14 | Inbound ports | PASSED |
| **2023-09-04 12:52:14** | **System: Services** | |
| 2023-09-04 12:52:15 | Ivanti Security Controls Console Service | PASSED |
| **2023-09-04 12:52:15** | **Network: Distribution Servers** | |
| 2023-09-04 12:52:15 | REST API Query – Distribution Servers | DISABLED |

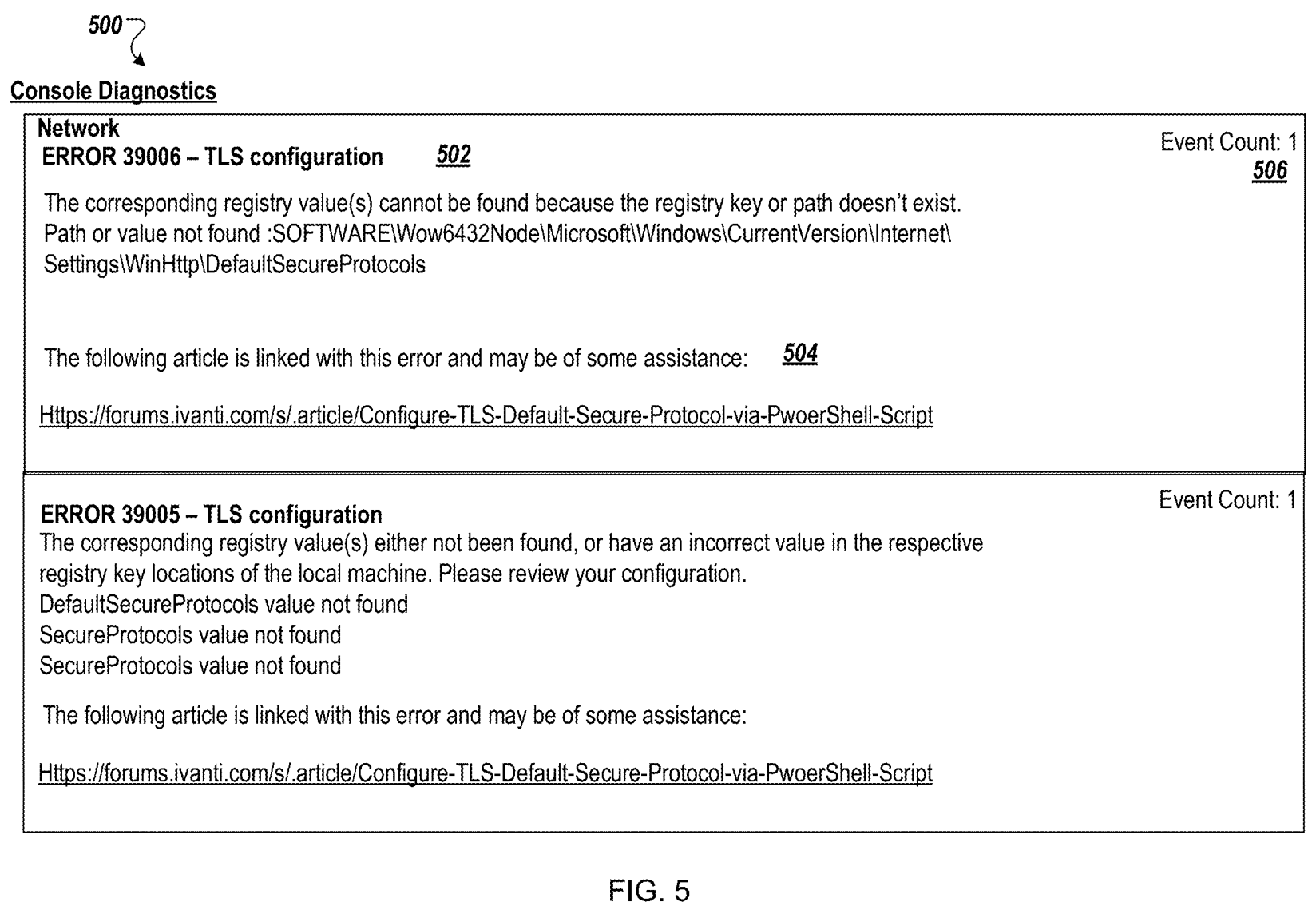

Console Diagnostics

Network

ERROR 39006 – TLS configuration 502

Event Count: 1
506

The corresponding registry value(s) cannot be found because the registry key or path doesn't exist.
Path or value not found :SOFTWARE\Wow6432Node\Microsoft\Windows\CurrentVersion\Internet\Settings\WinHttp\DefaultSecureProtocols The following article is linked with this error and may be of some assistance: 504

Https://forums.ivanti.com/s/.article/Configure-TLS-Default-Secure-Protocol-via-PwoerShell-Script Event Count: 1

ERROR 39005 – TLS configuration

The corresponding registry value(s) either not been found, or have an incorrect value in the respective registry key locations of the local machine. Please review your configuration.
DefaultSecureProtocols value not found
SecureProtocols value not found
SecureProtocols value not found The following article is linked with this error and may be of some assistance:

Https://forums.ivanti.com/s/.article/Configure-TLS-Default-Secure-Protocol-via-PwoerShell-Script

FIG. 5

REMOTE CONSOLE DIAGNOSTIC TOOLS

CROSS-REFERENCE TO RELATED APPLICATION

This application claims priority to and the benefit of U.S. Provisional Application No. 63/620,971, filed Jan. 15, 2024, which is incorporated herein by reference in its entirety.

FIELD OF THE INVENTION

The present disclosure generally relates to diagnostic tools for computing systems.

BACKGROUND

Software management providers may deliver software related to management services to clients. The management software may be centrally hosted at servers associated with a SaaS provider, may be locally hosted in a client's network, or may be provided to the clients through other delivery modes such as cloud-hosting, on-demand downloading, or webhosting.

One management software is configured to manage software updates of client computing devices in the client's network. For instance, a software developer may update and improve a software to add additional features, fix bugs, or revise aspects of the software (e.g., modifying a user interface layout). To access the updated software, the client may download additional data in the form of software patches. The SaaS software can provide insight into outstanding patches, provide insight to related vulnerabilities, and manage and provide delivery of the patches to the client devices.

Clients using the management software may encounter technical issues. For instance, the technical issues may stem from edge use cases that the management software is not equipped to properly handle, there might be client-side network connectivity issues, other problems associated with the client's intranet (e.g., due to firewall settings, etc.), or compatibility issues between different software applications used by the clients. At least some of these technical issues create difficulty in remotely diagnosing causes of the technical issue and implementing resolutions. For instance, network connectivity issues may isolate client devices. Accordingly, diagnostic efforts may involve local investigation and mitigation.

Some management software is deployed in an environment owned and managed by the client rather than by the software provider. This management software is referred to as an "on-premises". In on-premises patch management software deployments, data management and storage infrastructure owned by the client are relied upon rather than resources owned by a third party or the SaaS provider. In these types of deployments, diagnostics and mitigation of the technical issues may be more difficult because much of the operational data and settings are not visible to the software provider.

The software provider may have technical support personnel or tools that identify and fix the technical issues. Addressing the technical issues is difficult and time consuming. Moreover, some technical issues create circumstances in which diagnosis of the cause of the technical issue is not pragmatic or possible remotely. Accordingly, some clients rely on self-help processes implemented by a user alone or at the direction of technical support personnel. However, effectiveness of the self-help processes may depend on the experience level of the user and the ability of the technical support personnel to support and direct actions of the user. Moreover, some causes of technical issues (especially those that isolate the client devices) involve significant technical experience and may involve hours to properly diagnose and mitigate. Accordingly, there is a need in software provider networks for diagnostic tools related to software that can be implemented locally on client devices to diagnosis technical issues, especially those technical issues the isolate client devices that restrict remote diagnostic operations.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of the invention, an embodiment includes a system that may include a remote data storage device and a defective endpoint device. The remote data storage device may be associated with a management software provider that develops or manages an on-premises patch management product and a diagnostic tool. The diagnostic tool is configured to locally implement two or more diagnostic tests related to the on-premises patch management product. The diagnostic tool may be hosted on the remote data storage device. The defective endpoint device may be experiencing a technical issue related to the on-premises patch management product. The defective endpoint device is configured to download from the remote data storage device, a diagnostic tool and to launch the diagnostic tool. Responsive to the launch of the diagnostic tool and without further action by a user of the defective endpoint device, the diagnostic tool is configured to perform a console diagnostic test, an endpoint diagnostic test, and an agent diagnostic test to validate a functionality and an application configuration relating to the defective endpoint device. The diagnostic tool is configured to identify diagnostic failures and diagnostic successes resulting from the console diagnostic test, the endpoint diagnostic test, and the agent diagnostic test. The diagnostic tool is configured to determine suggested solutions to the diagnostic failures, the suggested solutions indicating one or more actions performable to fix the diagnostic failures. The diagnostic tool is configured to generate a display of a graphical user interface that depicts the results of the diagnostic tests including the diagnostic failures, the diagnostic successes, and the suggested solutions to the diagnostic failures. The diagnostic tool is configured to cause display of the graphical user interface at the defective endpoint device. The diagnostic tool is configured to cause removal of the diagnostic tool from the defective endpoint device after the display of the graphical user interface is caused.

According to another aspect of the invention, an embodiment includes a diagnostic tool configured to locally implement two or more diagnostic tests related to an on-premises patch management product operating on a defective endpoint device. The diagnostic tool includes one or more non-transitory computer-readable storage media configured to store instructions that, in response to being executed, cause a system to perform operations of endpoint diagnostics of technical issues experienced on a defective endpoint device related to an on-premises patch management product. The operations may be responsive to the launch of the diagnostic tool and without further action by a user of the defective endpoint device. The operations may include performing a console diagnostic test, an endpoint diagnostic test, and an agent diagnostic test to validate a functionality and an application configuration relating to the defective endpoint device. The operations may include identifying diagnostic failures and diagnostic successes resulting from the console diagnostic test, the endpoint diagnostic test, and the agent diagnostic test. The operations may include determining suggested solutions to the diagnostic failures, the suggested solutions indicating one or more actions performable to fix the diagnostic failures. The operations may include generating a display of a graphical user interface that depicts the results of the diagnostic tests including the diagnostic failures, the diagnostic successes, and the suggested solutions to the diagnostic failures. The operations may include causing display of the graphical user interface at the defective endpoint device. The operations may include causing removal of the diagnostic tool from the defective endpoint device after the display of the graphical user interface is caused.

According to yet another aspect of the invention, an embodiment includes a method of endpoint diagnostics of technical issues experienced on a defective endpoint device related an on-premises patch management product. The method may include downloading, from a remote data storage device, a diagnostic tool. The diagnostic tool may be configured to locally implement two or more diagnostic tests related to the on-premises patch management product operating on the defective endpoint device. The method may include launching the diagnostic tool on the defective endpoint device. Responsive to the launch of the diagnostic tool and without further action by a user of the defective endpoint device, the diagnostic tool being configured to perform a console diagnostic test, an endpoint diagnostic test, and an agent diagnostic test to validate a functionality and an application configuration relating to the defective endpoint device. The diagnostic tool may be configured to identify diagnostic failures and diagnostic successes resulting from the console diagnostic test, the endpoint diagnostic test, and the agent diagnostic test. The diagnostic tool may be configured to determine suggested solutions to the diagnostic failures, the suggested solutions indicating one or more actions performable to fix the diagnostic failures. The diagnostic tool may be configured to generate a display of a graphical user interface that depicts the results of the diagnostic tests including the diagnostic failures, the diagnostic successes, and the suggested solutions to the diagnostic failures. The diagnostic tool may be configured to cause display of the graphical user interface at the defective endpoint device. The diagnostic tool may be configured to cause removal of the diagnostic tool from the defective endpoint device after the display of the graphical user interface is caused.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the accompanying drawings in which:

FIG. 4 illustrates an example display of a Graphical User Interface (GUI) that shows a summary of diagnostic failures according to one or more embodiments of the present disclosure.

FIG. 5 illustrates an example display of a GUI that shows a detailed report of diagnostic failures according to one or more embodiments of the present disclosure.

DETAILED DESCRIPTION

Figure 1:
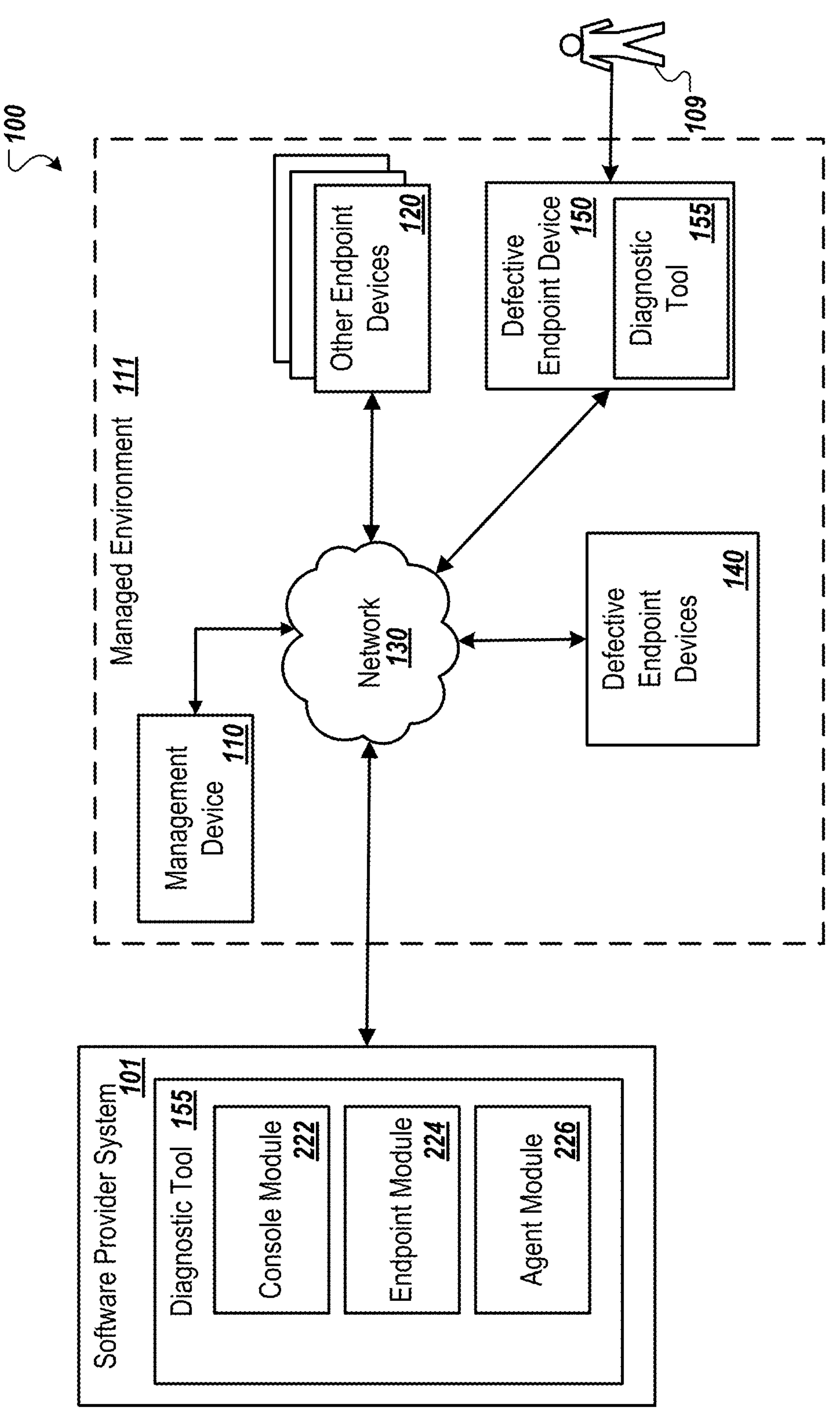
FIG. 1 is a diagram of a first example operating environment in which some embodiments of the present disclosure may be implemented.

Management software products may be designed for a wide range of functions. A client may use the management software product in an environment owned and managed by the client rather than an environment managed by a SaaS provider. This may be referred to as "on-premises management products". In deployed on-premises management products, the client may rely on data management and storage infrastructure owned by the client rather than by a third party or the SaaS provider. Consequently, the management software provider may not be able to access the on-premises management product as employed by the client or have visibility to particular settings and configurations of endpoint devices in a managed network associated with the client.

Updating or troubleshooting technical issues experienced by the client for the on-premises management products may be a demanding task. Particularly, data and configurations associated with the on-premises management product are managed by the client, which removes or obfuscates settings that may cause technical issues and error messages that result from the technical issue. The client, however, may not have the resources to identify and provide a solution to the technical issue without the assistance of the management software provider. However, diagnosing the technical issue may be resource intensive or not pragmatic because of the limited access to the settings and configurations of endpoints experiencing the technical issue.

Nevertheless, some existing on-premises management products are serviced by a technical support team of the management software provider. The technical support team may communicate directly with the client or a user within the managed network of the client to determine the cause of the technical issue and mitigate the technical issue. Relying on the technical support team to troubleshoot on-premises management products may be resource-intensive for the management software provider. Additionally, the technical support team may be given incorrect or vague descriptions of on-premises management product operations and outcomes, and in some instances, the client may or may not have ascertained whether a technical issue is occurring with the on-premises management product at all. Additionally or alternatively, the client may be experiencing multiple different technical issues, making it difficult to accurately communicate with the technical support team consistent details about the on-premises management product.

Embodiments of the present disclosure relate to systems and methods of technical issue diagnosis and mitigation. Some embodiments may be directed to diagnosis of technical issues experienced by clients implementing an on-premises management product. In particular, some embodiments describe a diagnostic tool that may be locally implemented. The diagnostic tool may be configured to facilitate self-diagnosis of technical issues of on-premises management products. The diagnostic tool may be locally installed, at least temporarily, by the client on all or some computer systems or endpoint devices managed by the client. The diagnostic tool may test features and configuration properties associated with the on-premises management product. In some embodiments, the diagnostic tool may perform diagnostic functions without or with minimal input from the client or a user. In some embodiments, the diagnostic tool may provide information about or propose possible solutions to the identified technical issues that may be employed by the client. Additionally, the diagnostic tool may generate a log file summarizing the identified technical issues and send the log file to the management software provider, which may allow the management software provider to assist the client in solving the technical issues described in the log file.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of some example configurations of the systems and methods.

FIG. 1 is a diagram of an example operating environment 100 in which some embodiments of the present disclosure may be implemented. The operating environment 100 includes a management device 110 that monitors and communicates with multiple endpoint devices 120, 140, and 150 (collectively, endpoints and generally endpoint) over a computer network 130 in a managed environment 111. In the managed environment 111 of FIG. 1, an on-premises patch management product may be implemented. The on-premises patch management product may be configured to manage and deploy software updates and patches in the managed environment 111. In addition, in some embodiments, the management device 110 may observe with which computing devices the endpoint devices 120 communicate, operations being performed by the endpoint devices 120, some combination thereof, or any other events or characteristics of the endpoint devices 120 via the computer network 130.

The operating environment 100 may also include a software provider system 101. The software provider system 101 may develop and provide the on-premises product to the managed environment 111. Additionally, the software provider system 101 may be configured to provide a diagnostic tool 155 to the managed environment 111 to troubleshoot and mitigate technical issues experienced at one or more of the endpoint devices.

For example, in some situations, one of the endpoint devices may experience technical issues related to implementation of the on-premises patch management product. In these and other situations, the endpoint device may be considered defective endpoint devices, which is indicated by reference numbers 140 or 150 in FIG. 1. The defective endpoint devices 140 may include any endpoint devices that experience errors during operation of the on-premises product. For example, a particular defective endpoint device 150 may fail to authorize user credentials, the on-premises product may fail to start up or run properly, or the particular defective endpoint device 150 may fail to access a specific webpage over the internet or access webpages over the internet.

Upon experiencing technical issues, the defective endpoint devices 140 or 150 may communicate with the management device 110 over the computer network 130 to request technical assistance. To address the technical issue, a diagnostic tool 155 may be deployed to the particular defective endpoint device 150. The diagnostic tool 155 may be launched to test features, operations, or other characteristics of the particular defective endpoint device 150 using one or more diagnostic operations. In some embodiments, the diagnostic tool 155 may perform the diagnostic operations directed to multiple, different aspects of the particular defective endpoint device 150. Some examples of the aspects may include console-level diagnostics relating to a security console of the management device 110 and/or the computer network 130, endpoint-level diagnostics relating to one or more endpoint devices, agent-level diagnostics relating to on-premises patch management product, other aspects, or combinations thereof. The diagnostic tool 155 may be configured specifically to the on-premises product in some embodiments. Additionally, the diagnostic tool 155 may output results of the results of the diagnostic operations to the software provider system 101, which may enable or facilitate the resolution of the technical issue. Some additional operations of the diagnostic tool 155 are described elsewhere in the present disclosure.

The operating environment 100 includes the software provider system 101, the management device 110 and the endpoint devices (collectively, environment components) that communicate data and information via the computer network 130 to enable diagnosis of technical issues on the particular defective endpoint device 150. Each of the environment components are introduced in the following paragraphs.

The computer network 130 may include one or more wide area networks (WANs) and/or local area networks (LANs) that enable the endpoint devices, the software provider system 101, and the management device 110 to communicate with each other. In some embodiments, the computer network 130 may include the Internet in which communicative connectivity between the components of the operating environment 100 is formed by logical and physical connections between multiple WANs and/or LANs. Additionally or alternatively, the computer network 130 may include one or more cellular radio frequency (RF) networks, one or more wired networks, one or more wireless networks (e.g., 802.xx networks), Bluetooth access points, wireless access points, Internet Protocol (IP)-based networks, or any other wired and/or wireless networks. The computer network 130 may also include servers that enable one type of network to interface with another type of network.

The management device 110 may include a hardware-based computing system and may be configured to communicate with other environment components via the computer network 130. The management device 110 may be configured to manage the endpoint devices in the managed environment 111. For instance, the management device 110 may be configured as an administrative device and may host a console or administrative portion of the on-premises patch management product. The management device 110 may facilitate a troubleshooting process implemented in the managed environment 111. For instance, the management device 110 may send a request to the software provider system 101 for the diagnostic tool 155 and relay the diagnostic tool 155 to the defective endpoint devices 140 and 150. Additionally or alternatively, the management device 110 may instruct another of the endpoint devices 120 that has previously used the diagnostic tool 155 to communicate the diagnostic tool 155 to the particular defective endpoint device 150. Instructions sent to the endpoint device 120 may include setup files (e.g., an executable set-up program file) for the diagnostic tool 155 in some embodiments.

The endpoint devices may include hardware-based computing devices implemented in the managed environment 111. The endpoint devices may be associated with a user 109. Examples of the endpoint devices include desktop computers, laptop computers, tablet computers, servers, cellular phones, smartphones, routers, gaming systems, etc.

The endpoints may request or initiate a process that results in the diagnostic tool 155 being locally installed thereon. For example, the particular defective endpoint device 150 may experience a technical issue with the on-premises patch management product. In response, the particular defective endpoint device 150 may report the technical issue (e.g., via a ticket-based service application). In response, the diagnostic tool 155 may be installed on the particular defective endpoint device 150. The diagnostic tool 155 may implement diagnostic operations on the particular defective endpoint device 150 to identify causes of the technical issue.

The software provider system 101 may include a hardware-based computing system. The software provider system 101 may be communicatively coupled to the managed environment 111 and components thereof via the computer network 130. In some embodiments, the software provider system 101 is included as a portion of one or more cloud-based servers or a distributed server functionality implemented across one or more cores in a remote cloud computing network.

The software provider system 101 may host the diagnostic tool 155 for distribution to the endpoints. The diagnostic tool 155 may include a console module 222, an endpoint module 224, and an agent module 226 (referred to collectively as the "computing modules"). The computing modules perform diagnostic testing of different aspects, features, or characteristics of the computing device (e.g., the endpoints) on which the diagnostic tool 155 is implemented.

The console module 222 may perform diagnostic testing with respect to operations of an endpoint device in relation to configuration settings associated with a console server. The console server may be an access point for the endpoint device to communicate with and perform operations with respect to a provider of the console server, such as the software provider system 101.

In some embodiments, the console server may be a software application that the endpoint device installs. In these and other embodiments, the console module 222 may verify system files and ensure that the console server software application is properly installed on the endpoint device. For example, the diagnostic testing may include verifying configuration settings of the endpoint device in relation to the console server to determine whether the console server is operable with respect to the endpoint device. Additionally, the diagnostic testing may include testing user credentials provided at the endpoint device with respect to the console system to identify user authentication errors.

The console module 222 may also run diagnostic tests with respect to agentless operations performed by endpoint devices. In some embodiments, endpoint devices may be configured to perform agentless operations based on instructions from a central authority, such as the software provider system 101. In these and other embodiments, the software provider system 101 may be configured to scan one or more endpoint devices, such as via a security console installed on the one or more endpoint devices, to determine whether the endpoint devices are experiencing any technical issues. Responsive to determining that a particular endpoint device is experiencing a technical issue, the software provider system 101 may push remedial operations to the particular endpoint device. For example, the software provider system 101 may send software patches, push policy configuration changes, update engine and data files, install new software application versions, refresh license authentications, perform self-authentication of login credentials, some combination thereof, or any other tasks for facilitating executing operations of the endpoint devices.

The console module 222 may remotely test connectivity elements involved in communications between an endpoint device and the console server. For example, the console module 222 may determine whether the endpoint device installed a console server application and whether the console server application is operable. As an additional or alternative example, the console module 222 may determine whether the endpoint device includes an operating system compatible with the console server or whether the endpoint device includes correctly enabled and configured applications that allow the endpoint device to communicate with the console server. In some embodiments, the console module 222 may prompt a user to specify one or more endpoint devices to be tested, credential objects for the endpoint devices, credential passwords, network ports to be tested, type of authentication used by the endpoint devices, type of encryption used by the endpoint devices, some combination thereof, or any other connectivity elements between endpoint devices and the console server. Additionally or alternatively, the console module 222 may be configured to automatically perform diagnostic tests related to agentless operations responsive to detecting that the console server application is installed on a particular endpoint device.

In some embodiments, the endpoint module 224 may perform diagnostic testing on endpoint devices that are targeted by operations of the console server in which the diagnostic testing of the endpoint module 224 is directed to verifying configuration settings of the tested endpoint devices. The endpoint module 224 may run diagnostic tests relating to user credentials, device domain names, authenticated proxy credentials, or any other configuration settings relating to the endpoint devices. For example, the endpoint module 224 may prompt a user of an endpoint device to input an Internet Protocol (IP) address corresponding to the endpoint device or a Fully Qualified Domain Name (FQDN) for the particular endpoint device. As an additional or alternative example, the endpoint module 224 may prompt the user for a username and a password responsive to the user indicating that an authenticated proxy is used in relation to the endpoint device.

The agent module 226 may test installation of an agent application on an endpoint device to ensure that the endpoint device is capable of running the agent application successfully. The agent application may be a software application that performs one or more specific software functions. For example, a first security agent application may be a software application that performs security scanning and reporting, while a second security agent application implements software patches on endpoint devices. In some embodiments, the agent module 226 may run diagnostic tests relating to file validation of the agent application. Additionally or alternatively, the agent module 226 may run diagnostic tests relating to validating execution of agent application operations, and responsive to failing to validate the execution of the agent application operations, identifying errors experienced during the course of the agent application operations.

In some embodiments, the computing modules may specify for which configuration settings diagnostic tests will be run and visually prompt a user for information used in the diagnostic tests. For example, the computing modules may display text fields, checkboxes, radio buttons, drop-down menus, or any other user input fields that guide the user to provide information about an endpoint device. Additionally or alternatively, the computing modules may visually specify to the user whether particular fields of information are applicable or inapplicable to planned diagnostic tests. For example, the computing modules may strikethrough, grey out, color code, or otherwise indicate that a particular input field will not provide information used for a particular diagnostic test.

The computing modules, components thereof, and combinations thereof may be implemented using hardware including a processor, a microprocessor (e.g., to perform or control performance of one or more operations), a field-programmable gate array (FPGA), or an application-specific integrated circuit (ASIC). In some other instances, the computing modules, combinations thereof, and components thereof may be implemented using a combination of hardware and software. Implementation in software may include rapid activation and deactivation of one or more transistors or transistor elements such as may be included in hardware of a computing system. Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the designations of different elements in the manner described are meant to help explain concepts described herein and are not limiting. For instance, in some embodiments, the management device 110, the software provider system 101, the endpoint devices, the diagnostic tool 155, or any combination thereof are delineated in the specific manner described to help with explaining concepts described herein but such delineation is not meant to be limiting. Further, the operating environment 100 may include any number of other elements or may be implemented within other systems or contexts than those described.

Figure 2:
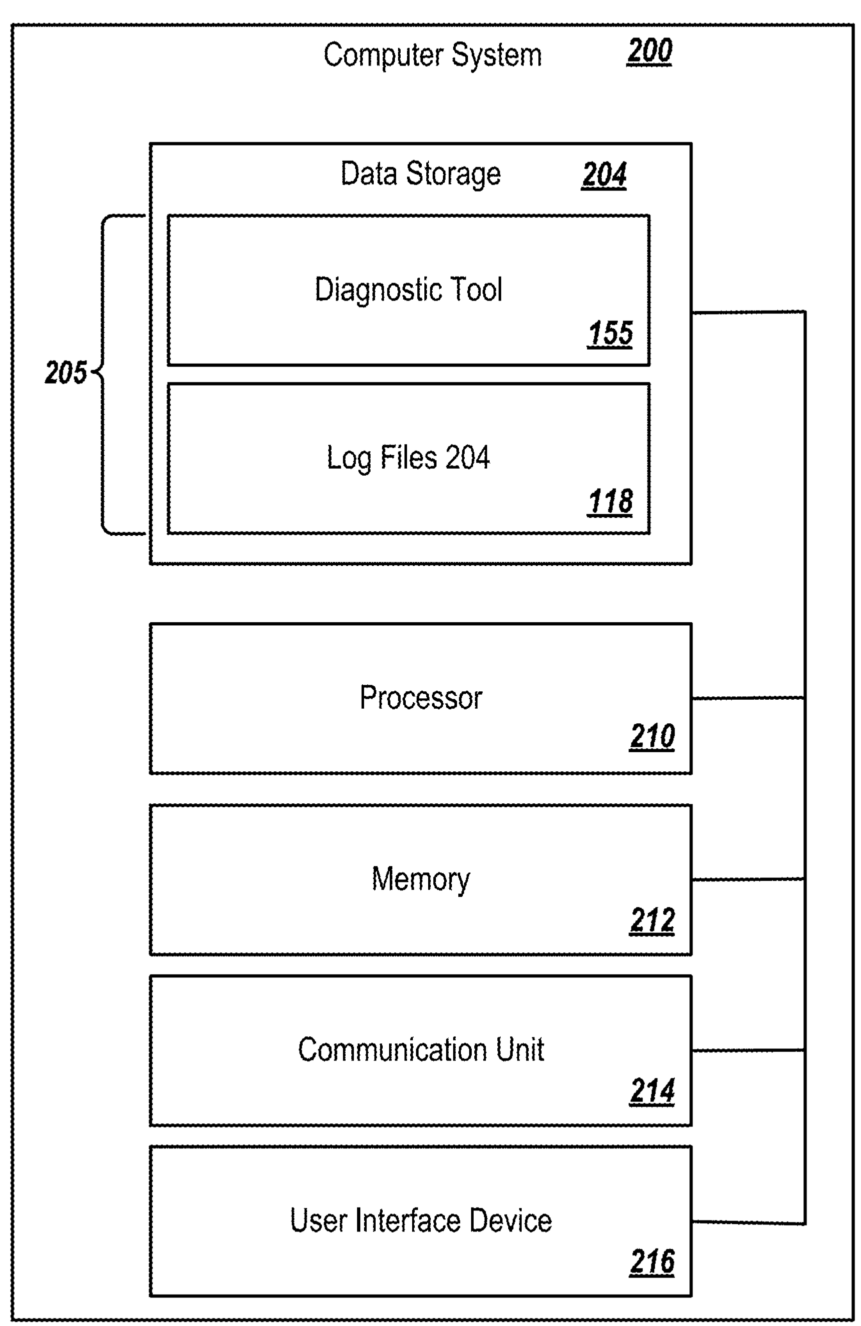
FIG. 2 is an example computing system configured to implement a self-diagnosis tool.

FIG. 2 is an example computer system 200. The computer system 200 may be implemented in the operating environment 100 of FIG. 1 or the computer system 300 of FIG. 3 (described below), for instance. Examples of the computer system 200 may include the management device 110, the endpoint devices, the software provider system 101, the diagnostic testing system 310, the log file system 320, or some combination thereof. The computer system 200 may include one or more processors 210, a memory 212, a communication unit 214, a user interface device 216, and a data storage 202 that includes log files 204 and the diagnostic tool 155 (collectively referred to herein as "system modules 205").

The processor 210 may include any suitable special-purpose or general-purpose computer, computing entity, or processing device including various computer hardware or software modules and may be configured to execute instructions stored on any applicable computer-readable storage media. For example, the processor 210 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 2, the processor 210 may more generally include any number of processors configured to perform individually or collectively any number of operations described in the present disclosure. Additionally, one or more of the processors 210 may be present on one or more different electronic devices or computing systems. In some embodiments, the processor 210 may interpret and/or execute program instructions and/or process data stored in the memory 212, the data storage 202, or the memory 212 and the data storage 202. In some embodiments, the processor 210 may fetch program instructions from the data storage 202 and load the program instructions in the memory 212. After the program instructions are loaded into the memory 212, the processor 210 may execute the program instructions.

The memory 212 and the data storage 202 may include computer-readable storage media for carrying or having computer-executable instructions or data structures stored thereon. Such computer-readable storage media may include any available media that may be accessed by a general-purpose or special-purpose computer, such as the processor 210. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 210 to perform a certain operation or group of operations.

The communication unit 214 may include one or more pieces of hardware configured to receive and send communications. In some embodiments, the communication unit 214 may include one or more of an antenna, a wired port, and modulation/demodulation hardware, among other communication hardware devices. In particular, the communication unit 214 may be configured to receive a communication from outside the computer system 200 and to present the communication to the processor 210 or to send a communication from the processor 210 to another device or network (e.g., the management device 110, the endpoint devices 120, the defective endpoint devices 140, the particular defective endpoint device 150, the software provider system 101, or some combination thereof).

The user interface device 216 may include one or more pieces of hardware configured to receive input from and/or provide output to a user. In some embodiments, the user interface device 216 may include one or more of a speaker, a microphone, a display, a keyboard, a touch screen, or a holographic projection, among other hardware devices.

The system modules 205 may include program instructions stored in the data storage 202. The processor 210 may be configured to load the system modules 205 into the memory 212 and execute the system modules 205. Alternatively, the processor 210 may execute the system modules 205 line-by-line from the data storage 202 without loading them into the memory 212. When executing the system modules 205, the processor 210 may be configured to perform one or more processes or operations described elsewhere in this disclosure.

Modifications, additions, or omissions may be made to the computer system 200 without departing from the scope of the present disclosure. For example, in some embodiments, the computer system 200 may not include the user interface device 216. In some embodiments, the different components of the computer system 200 may be physically separate and may be communicatively coupled via any suitable mechanism. For example, the data storage 202 may be part of a storage device that is separate from a device, which includes the processor 210, the memory 212, and the communication unit 214, that is communicatively coupled to the storage device. The embodiments described herein may include the use of a special-purpose or general-purpose computer including various computer hardware or software modules.

Figure 3:
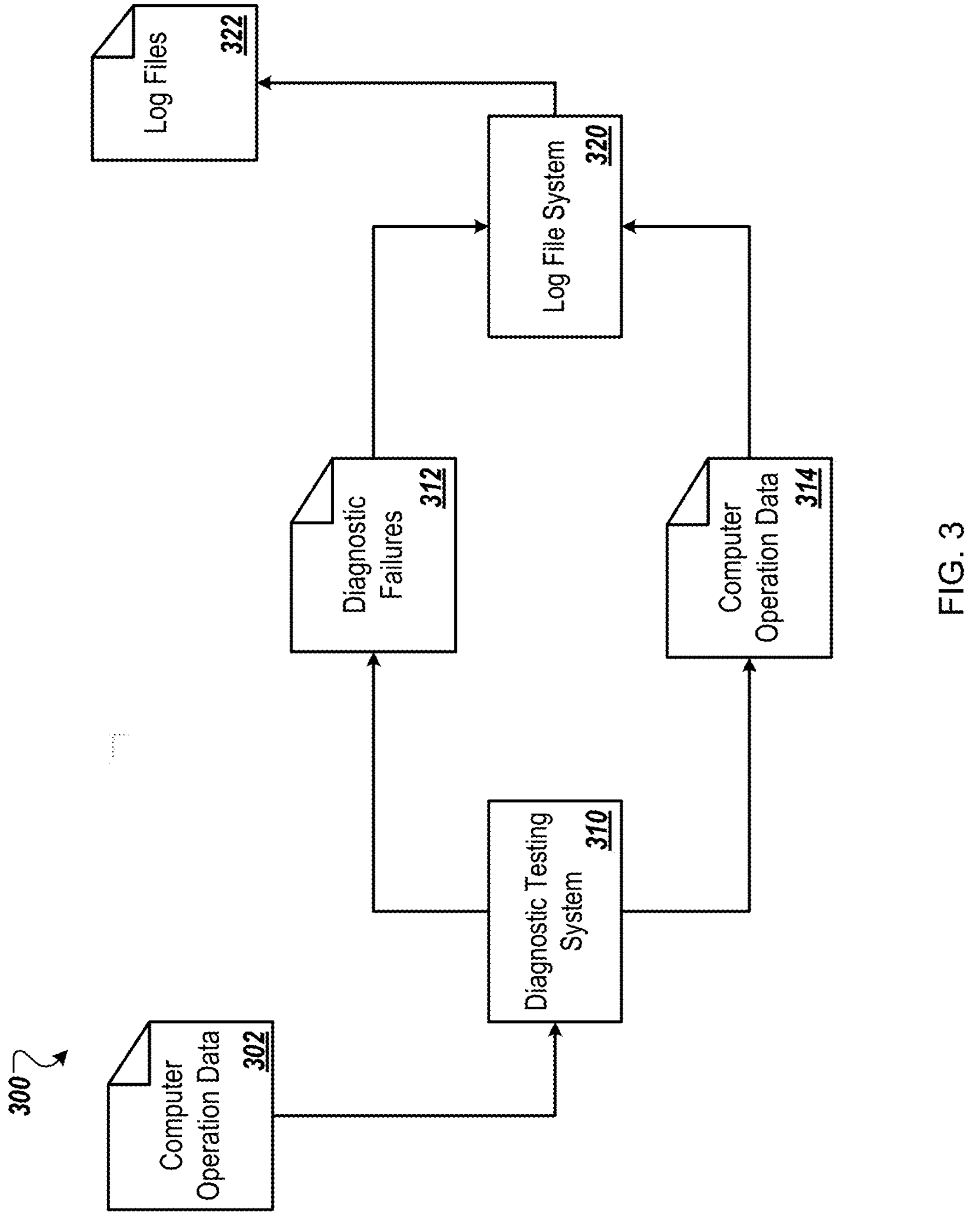
FIG. 3 is a diagram of an example embodiment of a computer system configured to perform diagnostic testing according to the present disclosure.

FIG. 3 is a diagram of an example embodiment of a computer system 300 configured to perform diagnostic testing according to the present disclosure. The system 300 may include a diagnostic testing system 310 that obtains and runs diagnostic tests on computer operation data 302. The diagnostic testing system 310 may output diagnostic failures 312 identified during the diagnostic tests and suggested solutions 314 corresponding to any identified diagnostic failures 312. In some embodiments, the diagnostic testing system 310 may perform operations of the diagnostic tool 155, including operations of the console module 222, the endpoint module 224, or the agent module 226, in performing the diagnostic tests that result in outputting the diagnostic failures 312 and identifying the suggested solutions 314. A log file system 320 may obtain the diagnostic failures 312 and the suggested solutions 314 to generate a log file 322 that summarizes the diagnostic failures 312 and the corresponding suggested solutions 314.

In some embodiments, the log file 322 outputted by the log file system 320 may be formatted as a .PDF file or any other file format that facilitates review of the log file 322 by a user of the system 300 or any other reviewing user. Additionally or alternatively, the log file system 320 may generate the log file 322 as a .LOG file or any other file format that may be sent to an external computer system, such as the software provider system 101 described in relation to FIG. 2, that may be configured to store or analyze the log file 322.

Modifications, additions, or omissions may be made to the system 300 without departing from the scope of the present disclosure. For example, the designations of different elements in the manner described are meant to help explain concepts described herein and are not limiting. For instance, in some embodiments, the diagnostic testing system 310 and the log file system 320 are delineated in the specific manner described to help with explaining concepts described herein but such delineation is not meant to be limiting. Further, the system 300 may include any number of other elements or may be implemented within other systems or contexts than those described.

FIG. 4 illustrates a first example display of a Graphical User Interface (GUI) that shows a summary of diagnostic failures 400 according to one or more embodiments of the present disclosure. The summary of diagnostic failures 400 displayed by the GUI may correspond to the log file 322 as described in relation to the system 300 of FIG. 3. In some embodiments, the summary of diagnostic failures 400 may be generated in response to an endpoint device, such as the endpoint devices 120, the defective endpoint devices 140, or the particular defective endpoint device 150 of the operating environment 100 of FIG. 1, executing one or more diagnostic tests.

The summary of diagnostic failures 400 may include one or more diagnostic events 402 that were tested by the executed diagnostic tests. For example, a particular diagnostic test may relate to verification of files associated with a security console as described in relation to the console module 222. The particular diagnostic test may generally be categorized as a file validation operation and labeled as "System: File validation" as illustrated in FIG. 4. Particular diagnostic tests that are part of the file validation operation may be noted in the summary of diagnostic failures 400. For example, whether a console system installation was proper (illustrated as "Application installation" and "Core engines/definitions content" in FIG. 4) may be part of the file validation operation. The summary of diagnostic failures 400 may indicate at what time the diagnostic tests were performed according to a timestamp 404.

Additionally or alternatively, the summary of diagnostic failures 400 may specify a status 406 of the performed diagnostic tests. Diagnostic tests that are successfully performed and do not result in any errors or other technical issues may include a passing status 410, such as the diagnostic tests associated with the file validation operation. Diagnostic tests that are not performed, such as a proxy configuration diagnostic test as illustrated in FIG. 4, may be indicated with a disabled status 412. Diagnostic tests that resulted in an error, such as a Transport Layer Security (TLS) configuration diagnostic test as illustrated in FIG. 4, may be indicated with a failing status 414. In some embodiments, the GUI may color code the status 406 corresponding to the diagnostic events 402. For example, the passing status 410 may include a green colored text box, while the disabled status 412 and the failing status 414 respectively include yellow colored and red colored text boxes.

FIG. 5 illustrates a second example display of a GUI that shows a detailed report of diagnostic failures 500 according to one or more embodiments of the present disclosure. In some embodiments, the detailed report of diagnostic failures 500 may be accessed from the summary of diagnostic failures 400 described in relation to FIG. 4. For example, a user selecting a particular event 402 from the summary of diagnostic failures 400 may output the detailed report of diagnostic failures 500 that corresponds to the selected event 402. As illustrated in FIG. 5, a detailed report regarding TLS configurations may be displayed in response to the "Network: TLS configuration" event being selected from the summary of diagnostic failures 400.

The detailed report of diagnostic failures 500 may include a description 502 that describes the diagnostic test performed and the diagnostic failure experienced that resulted in generation of the detailed report of diagnostic failures 500. For example, the description 502 may include an error code, a plain-language explanation of the error, some combination thereof, or any other information that may be descriptive of how the diagnostic test failed to run properly. Additionally or alternatively, the detailed report of diagnostic failures 500 may include a suggested solution 504 to the diagnostic failure summarized in the description 502. In some embodiments, the suggested solution 504 may include a plain-language suggestion or instruction that may be followed by a user to possibly fix the diagnostic failure. Additionally or alternatively, as illustrated in FIG. 5, the suggested solution 504 may include a hyperlink that guides the user to an article about the error, which may provide insight or instructions for addressing the diagnostic failure.

Figure 6:
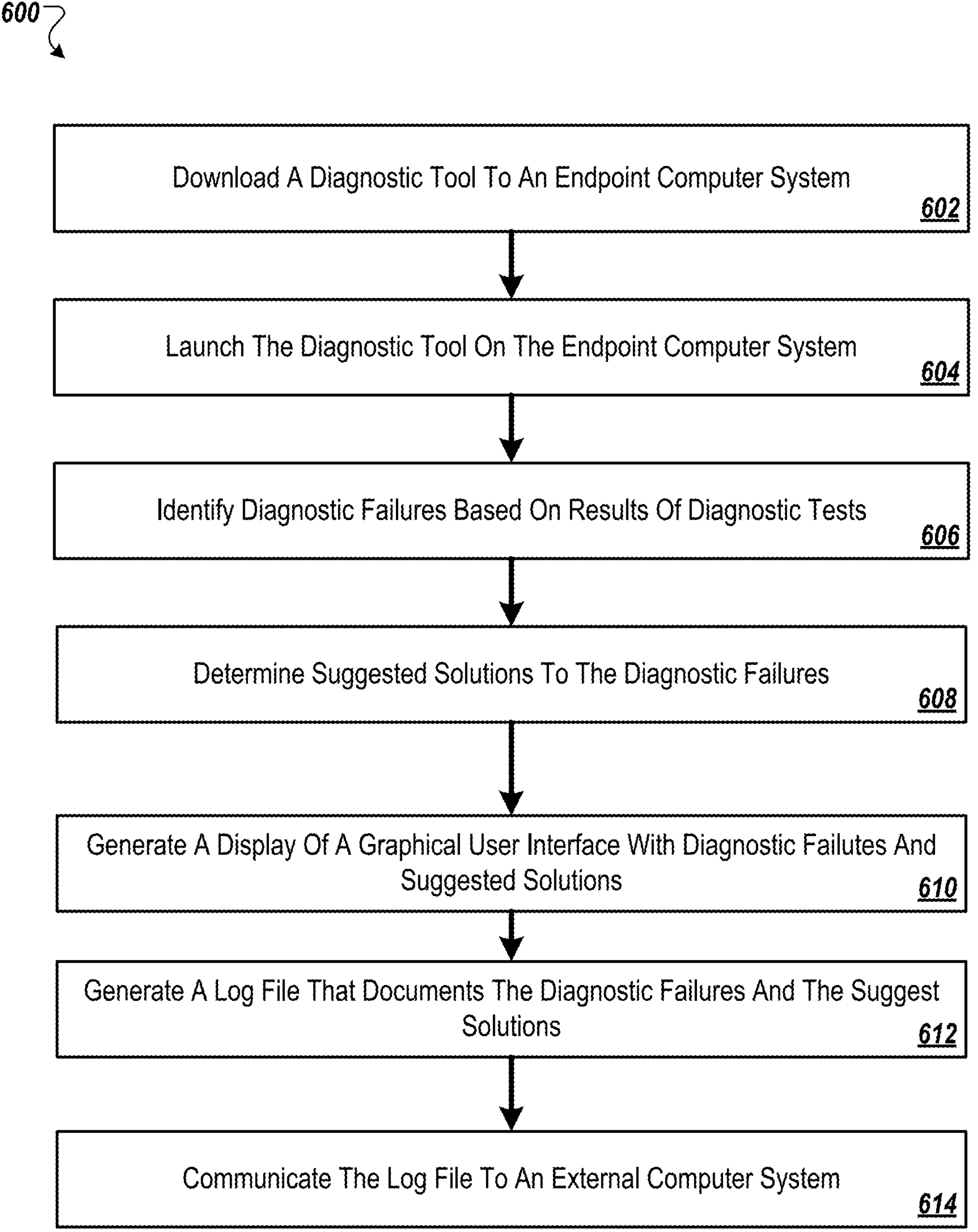
FIG. 6 is a flow chart of an example method of using the self-diagnosis system according to one or more embodiments of the present disclosure.

FIG. 6 is a flow chart of an example method of using the self-diagnosis system according to one or more embodiments of the present disclosure. The method 600 may be performed by any suitable system, apparatus, or device. For example, the operating environment 100 of FIG. 1 or the system 300 of FIG. 3 may perform one or more operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 602, where a diagnostic tool may be downloaded to an endpoint device. In some embodiments, the diagnostic tool may be downloaded from a remote data storage device. The remote data storage device may be associated with a management software provider that develops or manages the diagnostic tool. The endpoint device may download the diagnostic tool responsive to determining that the endpoint device is experiencing a technical issue relating to operations of the endpoint device.

At block 604, the diagnostic tool may be launched on the endpoint device. The diagnostic tool may validate a functionality or an application configuration relating to the endpoint device by using two or more diagnostic tests. In some embodiments, the diagnostic tests may include console diagnostic testing, endpoint diagnostic testing, or agent diagnostic testing. The diagnostic tests may more specifically include file validation, account credentials validation, network configuration validation, proxy setting configuration validation, webpage testing, port connectivity testing, SQL database testing, some combination thereof, or any other processes that may involve the functionality or application configurations of the endpoint device.

At block 606, diagnostic failures may be identified based on the results of the diagnostic tests. The diagnostic failures may specify how tested functionalities or application configurations experienced errors during the diagnostic tests. The display of the diagnostic failures may additionally or alternatively include an event count that indicates a number of times the diagnostic failure occurred during the diagnostic tests.

At block 608, suggested solutions to the diagnostic failures may be determined. The suggested solutions may involve actions a user of the endpoint device may perform to fix the diagnostic failures. In some embodiments, a particular suggested solution may include a hyperlink to a web article that documents details about a respective diagnostic failure, such as how the diagnostic failure occurs, how the diagnostic failure may affect operations of the endpoint device, how to resolve the diagnostic failure, some combination thereof, or any other information about the diagnostic failure.

At block 610, a display of a GUI with the diagnostic failures and the corresponding suggested solutions may be generated. In some embodiments, the display of the GUI may include a visual organization that is the same as or similar to the summary of diagnostic failures 400 described in relation to FIG. 4. Additionally or alternatively, a user may interact with the GUI and change how the information relating to the diagnostic failures and the suggested solutions is presented, such as by requesting the detailed report of diagnostic failures 500 described in relation to FIG. 5 from the summary of diagnostic failures 400. In some embodiments, the diagnostic failures and the corresponding suggested solutions may be presented as a user-readable data file, such as a .PDF file, in addition to or as an alternative to displaying the diagnostic failures and the corresponding suggested solutions as part of the GUI.

At block 612, a log file that documents the diagnostic failures and the corresponding suggested solutions may be generated. The log file may summarize which diagnostic tests were performed by the diagnostic tool and the outcomes of the performed diagnostic tests. For example, the log file may include information that is the same as or similar to the information displayed by the GUI that presents the diagnostic failures and the suggested solutions corresponding to each of the diagnostic failures.

At block 614, the log file may be communicated to an external computer system, such as a computer system associated with a management software provider that provided the diagnostic tool at block 602. In some embodiments, the log file generated at block 612 may be saved to a particular directory on the endpoint device, and the diagnostic tool or another software application may prompt the endpoint device to send any files included in the particular directory to the external computer system. As such, the process of installing and using the diagnostic tool on the endpoint device and transmitting the results of the diagnostic testing to the management software provider to facilitate addressing technical issues experienced by the endpoint device may be performed in a single run of the method 600.

Modifications, additions, or omissions may be made to the method 600 without departing from the scope of the disclosure. For example, the designations of different elements in the manner described is meant to help explain concepts described herein and is not limiting. Additionally or alternatively, the designations of the steps and operations associated with the method 600 are meant to be illustrative and not limiting. For example, identifying the diagnostic failures at block 606, determining suggested solutions to the diagnostic failures at block 608, documenting the diagnostic failures and the suggested solutions in a log file at block 612, or any other steps involved in the method 600 may be performed simultaneously or in a different order than the manner described. Further, the method 600 may include any number of other elements or may be implemented within other systems or contexts than those described.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of endpoint diagnostics of technical issues experienced on a defective endpoint device related to an on-premises patch management product, the method comprising:

downloading, from a remote data storage device, a diagnostic tool, wherein the diagnostic tool is configured to locally implement two or more diagnostic tests related to the on-premises patch management product operating on the defective endpoint device; and launching the diagnostic tool on the defective endpoint device, wherein responsive to the launch of the diagnostic tool and without further action by a user of the defective endpoint device, the diagnostic tool being configured to:

perform a console diagnostic test, an endpoint diagnostic test, and an agent diagnostic test to validate a functionality and an application configuration relating to the defective endpoint device;

identify diagnostic failures and diagnostic successes resulting from the console diagnostic test, the endpoint diagnostic test, and the agent diagnostic test;

determine suggested solutions to the diagnostic failures, the suggested solutions indicating one or more actions performable to fix the diagnostic failures;

generate a display of a graphical user interface that depicts the results of the diagnostic tests including the diagnostic failures, the diagnostic successes, and the suggested solutions to the diagnostic failures;

cause display of the graphical user interface at the defective endpoint device; and cause removal of the diagnostic tool from the defective endpoint device after the display of the graphical user interface is caused.

2. The method of claim 1, wherein the diagnostic tool is further configured to:

generate a log file that documents the diagnostic failures and the suggested solutions corresponding to the diagnostic failures; and communicate the log file to an external computer system.

3. The method of claim 1, wherein the console diagnostic test, the endpoint diagnostic test, or the agent diagnostic test includes performing at least one of:

file validation, account credentials validation, network configuration validation, proxy setting configuration validation, webpage testing, port connectivity testing, or SQL database testing.

4. The method of claim 1, wherein the suggested solutions to the diagnostic failures include a hyperlink to a web article that documents the diagnostic failures.

5. The method of claim 1, wherein a diagnostic failure included in the graphical user interface specifies an aspect of the functionality or the application configuration that caused a technical issue at the defective endpoint device.

6. The method of claim 1, wherein the diagnostic failure included in the display of the graphical user interface specifies an event count that indicates a number of times the diagnostic failure occurs during the console diagnostic test, the endpoint diagnostic test, and the agent diagnostic test.

7. The method of claim 1, wherein:

the remote data storage device is associated with a management software provider that develops or manages the diagnostic tool; and the management software provider is the developer or vendor of the on-premises patch management product.

8. The method of claim 1, wherein the diagnostic tool includes a console module configured to test agentless operations performed by the defective endpoint device.

9. The method of claim 1, further comprising:

receiving, at the defective endpoint device, a remedial operation configured to mitigate one of the diagnostic failures, the remedial operation including a software patch, a push policy configuration change, an update engine and data file, instructions to install a new software application version, a refresh license authentication, or instructions to perform a self-authentication of login credentials; and implementing the remedial operation at the defective endpoint device.

10. A diagnostic tool configured to locally implement two or more diagnostic tests related to an on-premises patch management product operating on a defective endpoint device, the diagnostic tool comprising:

one or more non-transitory computer-readable storage media configured to store instructions that, in response to being executed, cause a system to perform operations of endpoint diagnostics of technical issues experienced on a defective endpoint device related to an on-premises patch management product, the operations comprising:

responsive to the launch of the diagnostic tool and without further action by a user of the defective endpoint device:

performing a console diagnostic test, an endpoint diagnostic test, and an agent diagnostic test to validate a functionality and an application configuration relating to the defective endpoint device;

identifying diagnostic failures and diagnostic successes resulting from the console diagnostic test, the endpoint diagnostic test, and the agent diagnostic test;

determining suggested solutions to the diagnostic failures, the suggested solutions indicating one or more actions performable to fix the diagnostic failures;

generating a display of a graphical user interface that depicts the results of the diagnostic tests including the diagnostic failures, the diagnostic successes, and the suggested solutions to the diagnostic failures;

causing display of the graphical user interface at the defective endpoint device; and causing removal of the diagnostic tool from the defective endpoint device after the display of the graphical user interface is caused.

11. The diagnostic tool of claim 10, wherein the operations further comprise:

generating a log file that documents the diagnostic failures and the suggested solutions corresponding to the diagnostic failures; and communicating the log file to an external computer system.

12. The diagnostic tool of claim 10, wherein the console diagnostic test, the endpoint diagnostic test, or the agent diagnostic test includes performing at least one of:

file validation, account credentials validation, network configuration validation, proxy setting configuration validation, webpage testing, port connectivity testing, or SQL database testing.

13. The diagnostic tool of claim 10, wherein the suggested solutions to the diagnostic failures include a hyperlink to a web article that documents the diagnostic failures.

14. The diagnostic tool of claim 10, wherein a diagnostic failure included in the graphical user interface specifies an aspect of the functionality or the application configuration that caused a technical issue at the defective endpoint device.

15. The diagnostic tool of claim 10, wherein the diagnostic failure included in the display of the graphical user interface specifies an event count that indicates a number of times the diagnostic failure occurs during the console diagnostic test, the endpoint diagnostic test, and the agent diagnostic test.

16. A system, comprising:

a remote data storage device that is associated with a management software provider that develops or manages an on-premises patch management product and a diagnostic tool configured to locally implement two or more diagnostic tests related to the on-premises patch management product, wherein the diagnostic tool is hosted on the remote data storage device; and a defective endpoint device experiencing a technical issue related to the on-premises patch management product, the defective endpoint device downloads from the remote data storage device, the diagnostic tool and launch the diagnostic tool;

responsive to the launch of the diagnostic tool and without further action by a user of the defective endpoint device, the diagnostic tool being configured to:

perform a console diagnostic test, an endpoint diagnostic test, and an agent diagnostic test to validate a functionality and an application configuration relating to the defective endpoint device;

identify diagnostic failures and diagnostic successes resulting from the console diagnostic test, the endpoint diagnostic test, and the agent diagnostic test;

determine suggested solutions to the diagnostic failures, the suggested solutions indicating one or more actions performable to fix the diagnostic failures;

generate a display of a graphical user interface that depicts the results of the diagnostic tests including the diagnostic failures, the diagnostic successes, and the suggested solutions to the diagnostic failures;

cause display of the graphical user interface at the defective endpoint device; and cause removal of the diagnostic tool from the defective endpoint device after the display of the graphical user interface is caused.

17. The system of claim 16, wherein the diagnostic tool is further configured to:

generate a log file that documents the diagnostic failures and the suggested solutions corresponding to the diagnostic failures; and communicate the log file to an external computer system.

18. The system of claim 16, wherein the console diagnostic test, the endpoint diagnostic test, or the agent diagnostic test includes performing at least one of:

file validation, account credentials validation, network configuration validation, proxy setting configuration validation, webpage testing, port connectivity testing, or SQL database testing.

19. The system of claim 16, wherein the diagnostic tool includes a console module configured to test agentless operations performed by the defective endpoint device.

20. The system of claim 16, wherein:

the defective endpoint device is configured to receive a remedial operation from the remote data storage device, the remedial operation is configured to mitigate one of the diagnostic failures, the remedial operation includes a software patch, a push policy configuration change, an update engine and data file, instructions to install a new software application version, a refresh license authentication, or instructions to perform a self-authentication of login credentials; and after the remedial operation is received, the defective endpoint device is configured to implement the remedial operation at the defective endpoint device.

* * * * *